(12) United States Patent
Ito

(10) Patent No.: US 8,547,564 B2
(45) Date of Patent: Oct. 1, 2013

(54) IMAGE PROCESSING APPARATUS CONNECTABLE TO A PLURALITY OF HOST DEVICES AND HAVING A RECEIVER

(75) Inventor: Yukio Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1106 days.

(21) Appl. No.: 12/219,888

(22) Filed: Jul. 30, 2008

(65) Prior Publication Data

US 2009/0051958 A1    Feb. 26, 2009

(30) Foreign Application Priority Data

Aug. 21, 2007  (JP) ................................ 2007-214992

(51) Int. Cl.
 *G06K 15/00* (2006.01)
(52) U.S. Cl.
 USPC ....... 358/1.14; 358/1.13; 358/1.15; 358/1.16; 358/296; 399/37; 399/70; 399/88; 709/224; 710/19; 710/46; 710/47; 713/300; 713/310; 713/320; 713/322; 713/323; 713/324; 713/330
(58) Field of Classification Search
 USPC ........................................................ 709/224
 See application file for complete search history.

(56) References Cited

U.S. PATENT DOCUMENTS

| | | | | |
|---|---|---|---|---|
| 5,897,252 | A | * | 4/1999 | Kanakubo .................... 400/74 |
| 6,305,769 | B1 | * | 10/2001 | Thayer et al. ................ 347/1 |
| 7,523,360 | B2 | * | 4/2009 | Hashimoto et al. .......... 714/57 |
| 7,725,775 | B2 | * | 5/2010 | Tsuzuki ....................... 714/44 |
| 2003/0081261 | A1 | * | 5/2003 | Tanimoto ................. 358/400 |
| 2004/0057069 | A1 | * | 3/2004 | Ikeda ....................... 358/1.14 |
| 2005/0267797 | A1 | * | 12/2005 | Takahashi et al. ........... 705/11 |
| 2006/0055791 | A1 | * | 3/2006 | Morino ................... 348/211.2 |
| 2007/0097424 | A1 | * | 5/2007 | Mizuno .................... 358/1.15 |
| 2007/0124617 | A1 | * | 5/2007 | Takamoto ................. 713/310 |

FOREIGN PATENT DOCUMENTS

JP    08-025757    1/1996
JP    2001353929 A  * 12/2001

* cited by examiner

*Primary Examiner* — Miya J Cato
(74) *Attorney, Agent, or Firm* — Rabin & Berdo, P.C.

(57) ABSTRACT

An image processing apparatus includes an image forming unit, power supplier, power controller, memory, signal transmission unit and transmission timer. The image forming unit forms an image based on image data from a plurality of host devices. The power supplier supplies power to a power system including the image forming unit. The power controller controls the power from the power supplier to the power system. The memory stores a usage amount of each host device. The signal transmission unit transmits a response request to a host device having at least a predetermined usage amount. The transmission timer counts a first time period from a transmission of the response request. The power controller halts the power from the power supplier to the power system when determining, based on the first time period, that a reply to the response request is not transmitted from the specific host device for a predetermined period.

15 Claims, 13 Drawing Sheets

FIG. 3

| HOST DEVICE | IP ADDRESS | FILE NAME | TIME |
|---|---|---|---|
| 5B | 12.34.56.788 | B1.xls | 8:42 |
| 5A | 12.34.56.789 | A1.doc | 9:00 |
| 5A | 12.34.56.789 | A2.doc | 9:45 |
| 5A | 12.34.56.789 | A3.doc | 12:03 |
| 5B | 12.34.56.788 | B2.xls | 12:30 |
| 5C | 12.34.56.787 | C1.pdf | 13:05 |
| 5D | 12.34.56.786 | D1.ppt | 14:56 |
| 5A | 12.34.56.789 | A4.doc | 15:30 |
| 5A | 12.34.56.789 | A5.doc | 16:52 |
| 5B | 12.34.56.788 | B3.xls | 17:13 |

FIG. 4

| HOST DEVICE | IP ADDRESS | USAGE |
|---|---|---|
| 5A | 12.34.56.789 | 50% |
| 5B | 12.34.56.788 | 30% |
| 5C | 12.34.56.787 | 10% |
| 5D | 12.34.56.786 | 10% |

FIG. 5

| DAY | OPERATION TIME |
|---|---|
| MON – THU | 8:30~19:00 |
| FRI | 8:30~17:00 |
| SAT & SUN | HOLIDAY |

FIG. 10

| ERROR | RESTORABILITY |
|---|---|
| JAMMED SHEET | EASY |
| OUT OF SHEET | EASY |
| OUT OF TONER | DIFFICULT |
| DAMAGE | DIFFICULT |

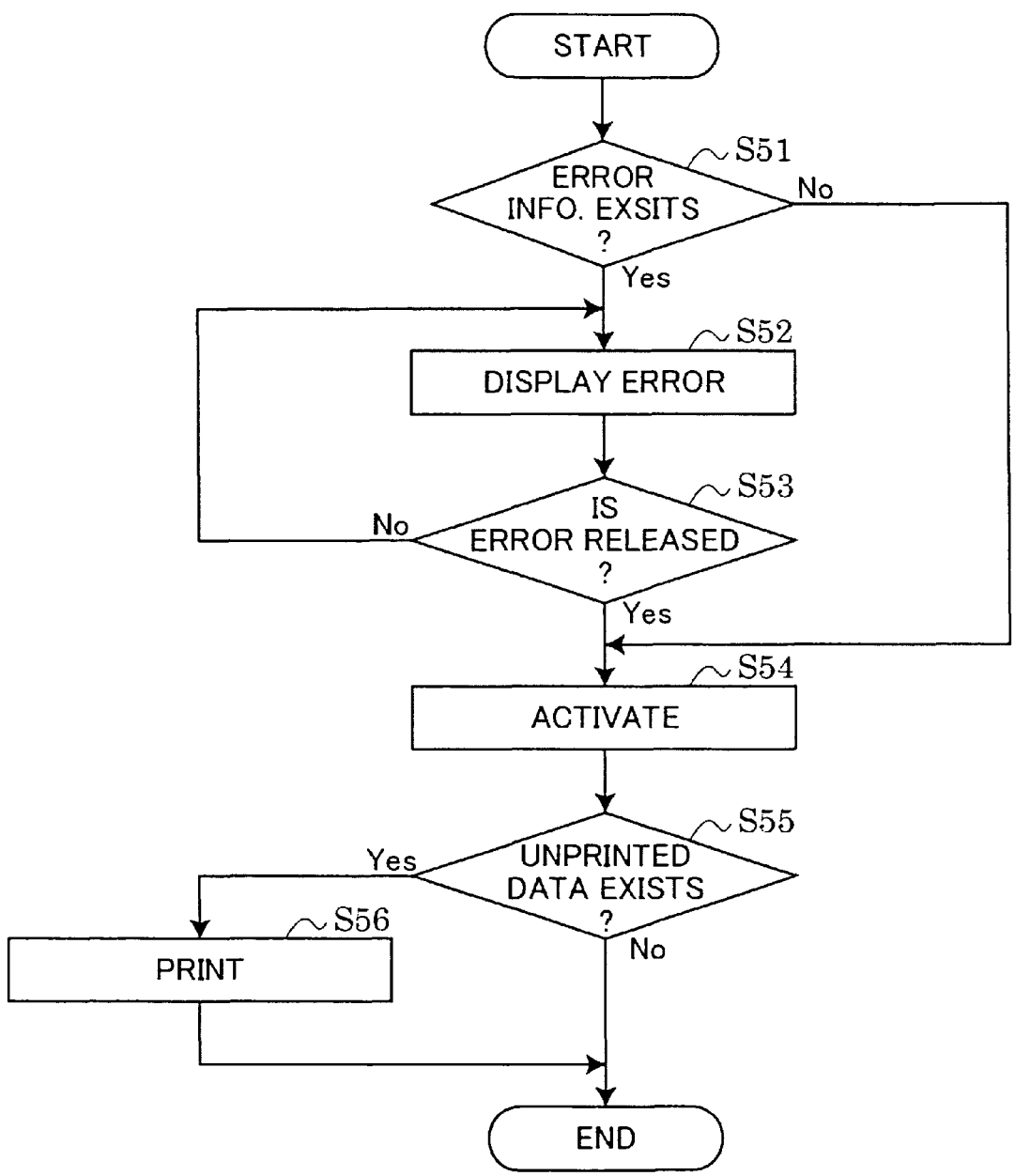

IMAGE PROCESSING APPARATUS CONNECTABLE TO A PLURALITY OF HOST DEVICES AND HAVING A RECEIVER

BACKGROUND OF THE INVENTION

1. Field of the Invention

The present invention relates to an image processing apparatus.

2. Description of Related Art

A prior art image processing apparatus such as a printer capable of automatically turning off a power source is commonly known in the art. For example, when a printing request is not provided from a host device for a predetermined time period, such an image processing apparatus of prior art automatically turns off the power source thereof.

Japanese Un-examined Patent Application Publication No. H8-25757 discloses a prior art printer capable of automatically turning off a power source. Specifically, the prior art printer turns off the power source thereof when response requests are transmitted to all host devices connected through a network, and no reply is provided for a predetermined time period. Such a printer ensures an energy saving, for example, even when a user forgets to turn off the power source.

However, since the response requests are transmitted to all of the host devices through the networks, the replies corresponding to the response requests are transmitted from the host devices regardless of being in use in a case where respective host devices are being started. For example, when one of the host devices is not in use while being started, the prior art printer determines that the host device is being used based on the reply corresponding to the response request. In other word, the prior art printer cannot turn off the power source in such a situation. Consequently, the prior art printer has a problem that the energy is not saved in such a situation.

BRIEF SUMMARY OF THE INVENTION

An aspect of the invention provides an image processing apparatus connectable to a plurality of host devices, and the image processing apparatus includes: an image forming unit forming an image based on image data transmitted from the plurality of host devices; a power supply unit supplying power to a power system including the image forming unit; a power control unit controlling the power supplied from the power supply unit to the power system; a memory storing a usage amount of each of the plurality of host devices; a signal transmission unit transmitting a response request signal to a specific host device among the plurality of host devices, the specific host device having at least a predetermined amount of the usage amount stored in the memory; a transmission timer counting a first elapsed time period from a time that the response request signal is transmitted to the specific host device from the signal transmission unit. The power control unit halts the power supply from the power supply unit to the power system when determining, based on the first elapsed time period counted by the transmission timer, that a reply corresponding to the response request signal is not transmitted from the specific host device for a predetermined time period.

Another aspect of the invention provides an image processing apparatus connectable to a plurality of host devices, the image processing apparatus includes: an image forming unit forming an image based on image data transmitted from the plurality of host devices; a power supply unit supplying power to a power system including the image forming unit; a power control unit controlling the power supplied from the power supply unit to the power system; a memory storing a usage amount of each of the plurality of host devices; an error detection unit detecting an occurrence of an error in the image forming unit; a signal transmission unit transmitting a response request signal to a specific host device among the plurality of host devices when the error detection unit detects the error, the specific host device having at least a predetermined usage amount stored in the memory; and a transmission timer counting an elapsed time period from a time that the response request signal is transmitted from the signal transmission unit to the specific host device. The power control unit halts the power supply from the power supply unit to the power system when determining, based on the elapsed time period counted by the transmission timer, that a reply corresponding to the response request signal is not transmitted from the specific host device for a predetermined time period.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein:

FIG. 3 is a schematic diagram illustrating an example of a print log stored in the printer of FIG. 2;

FIG. 4 is a schematic diagram illustrating an example of a usage amount of each host device stored in the printer of FIG. 2;

FIG. 5 is a schematic diagram illustrating an example of an operating time stored in the printer of FIG. 2;

FIG. 10 is a schematic diagram illustrating an example of an error stored in the printer of FIG. 9;

FIG. 13 is yet another flowchart illustrating an example procedure for operating the printer of FIG. 9.

DETAILED DESCRIPTION OF PREFERRED EMBODIMENTS

Figure 1:
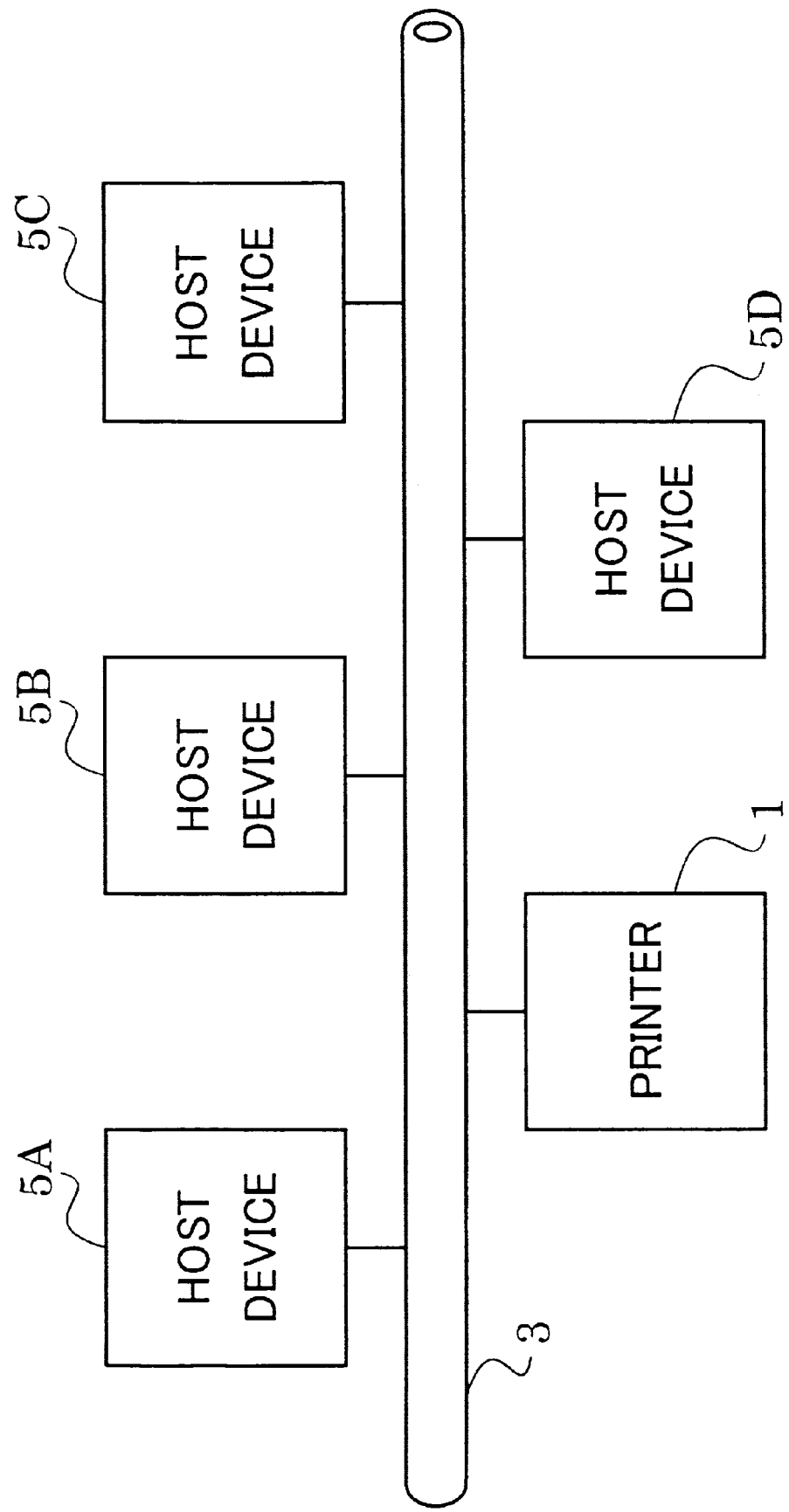
FIG. 1 is a block diagram illustrating a printing system according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Reference is now made to the drawings, wherein like reference numerals designate identical or corresponding parts throughout the several views.

Referring to FIG. 1, a printing system including a printer 1 as an image processing apparatus according to a first embodiment of the present invention is illustrated. The printer 1 is connected to a plurality of host devices 5A, 5B, 5C, and 5D through a local area network (LAN) 3. The printer 1 prints an image based on image data transmitted from each of the host devices 5A, 5B, 5C, and 5D so as to provide the image to a user. A description of the host devices 5A, 5B, 5C, and 5D is hereafter given by using host devices 5 as representative of the host devices 5A, 5B, 5C, and 5D.

Figure 2:
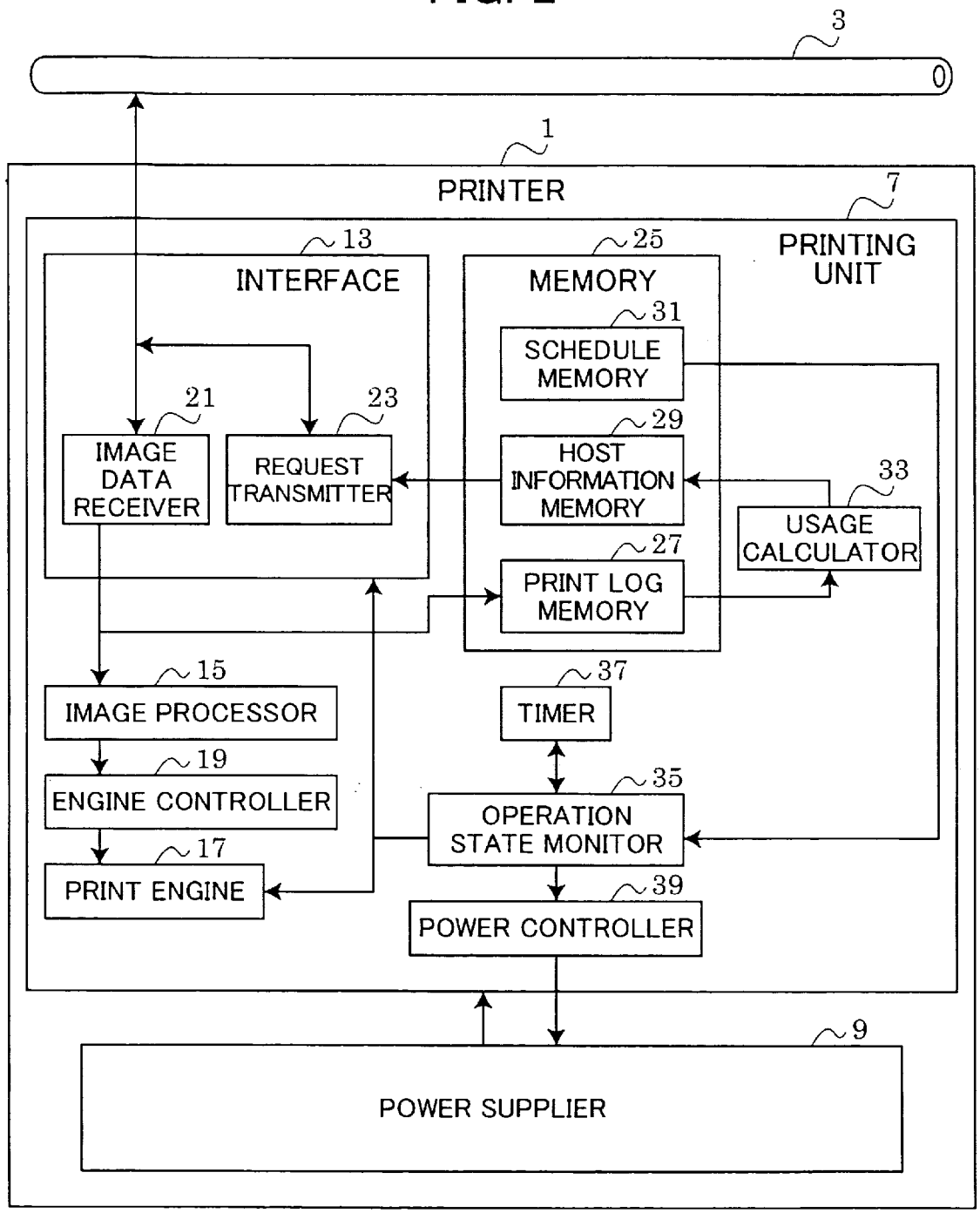
FIG. 2 is a block diagram illustrating a printer as an image processing apparatus of the printing system of FIG. 1.

Referring to FIG. 2, the printer 1 of the printing system is illustrated in a block diagram. The printer 1 includes a printing unit 7 involving the image data transmitted from the host devices 5 and a power supplier 9 supplying a power to the printing unit 7. The printing unit 7 prints the image based on the image data with the power supplied from the power supplier 9.

The printing unit 7 includes an interface 13, an image processor 15 and an engine controller 19. The interface 13 transmits and receives information to and from the host devices 5 through the LAN 3. The image processor 15 analyzes the received image data and prepares dot data. The engine controller 19 controls a print engine 17 serving as an image forming unit that prints the image on a sheet based on the dot data. Such printing unit 7 supplies the image data received in the interface 13 to the image processor 15. Subsequently, the image processor 15 prepares the dot data by analyzing the supplied image data, and supplies to the engine controller 19. Then, the engine controller 19 controls the print engine 17 including an exposure unit, development unit, transfer unit and fixing unit based on the dot data. The print engine 17 forms the image corresponding to the dot data on a recording medium such as a sheet while being controlled by the engine controller 19, and provides the image to the user.

The interface 13 includes an image data receiver 21 receiving the image data transmitted from the host devices 5, and a request transmitter-receiver 23 serving as a signal transmitter transmitting a response request signal to the host devices 5. The image data receiver 21 receives the image data transmitted from the host devices 5 and supplies to the image processor 15. When the image data receiver 21 receives the image data, a record of receiving the image data is stored as a print log in a memory 25. The request transmitter-receiver 23 refers to predetermined information stored in the memory 25, and transmits the response request to at least one of host devices 5A to 5D. The request transmitter-receiver 23 also receives replies from the host devices 5.

The memory 25 stores a various kinds of information. Specifically, the memory 25 includes a plurality of areas such as a print log memory 27 storing the print log, a host information memory 29 storing a usage amount of each of the host devices 5, and a schedule memory 31 serving as an office hour memory storing a length of an operation time of the printer 1 corresponding to office hour of the user.

Referring to FIG. 3, an example of the print log stored in the print log memory 27 is illustrated. The print log memory 27 stores the print log associated with a host device name, an IP (Internet Protocol) address, a file name of the image data, and a receiving time. Such a print log is updated for each reception of the image data received in the image data receiver 21.

Referring to FIG. 4, an example of the usage amount stored in the host information memory 29 is illustrated. The host information memory 29 stores the usage amount of each of the host devices 5. A usage calculator 33 reads the print log stored in the print log memory 27, and calculates the usage amount of the printer 1 as a whole with respect to each of the host devices 5.

Referring to FIG. 5, an example of the operation time stored in the schedule memory 31 is illustrated. The user arranges the operation time of the printer 1 beforehand.

Moreover, as illustrated in FIG. 2, the printing unit 7 includes an operation state monitor 35 monitoring an operation state of the interface 13 and the print engine 17. The operation state monitor 35 monitors the reception of the image data, the presence or absence of the response request and an error occurrence in the interface 13. When the request transmitter-receiver 23 transmits the response request to the host devices 5, the operation state monitor 35 activates a timer 37 that includes a transmission timer and a power supply timer. The operation state monitor 35 monitors the presence or absence of the reply corresponding to the response request in the request transmitter-receiver 23. When no reply is transmitted for a certain time period, the operation state monitor 35 instructs the power controller 39 controlling the power supply from the power supplier 9 to a power system driving the printer 1 to halt the power supply. Here, the presence or absence of the reply is determined based on the certain time period that is a criterion time period determined and stored by the user beforehand. The certain time period is re-writable.

Figure 6:
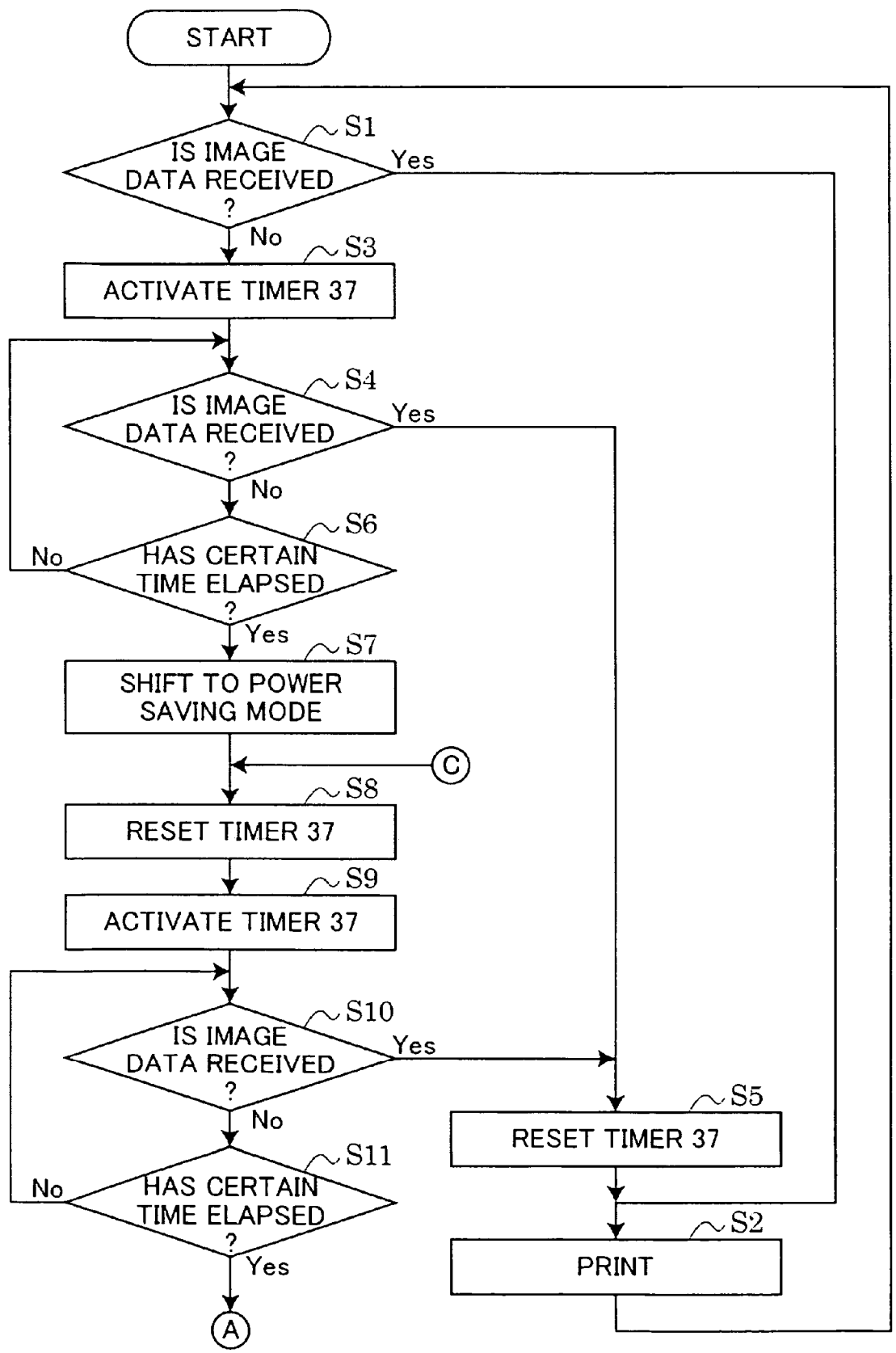
FIG. 6 is a flowchart illustrating an example procedure for operating the printer of FIG. 2.
Figure 7:
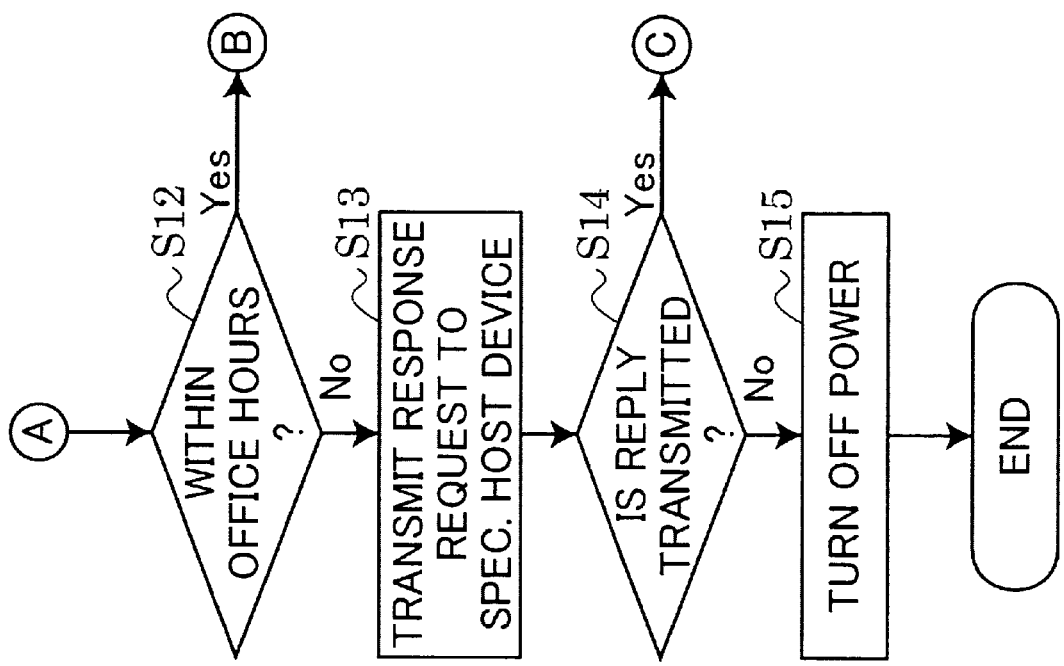
FIG. 7 is another flowchart illustrating an example procedure for operating the printer of FIG. 2.
Figure 8:
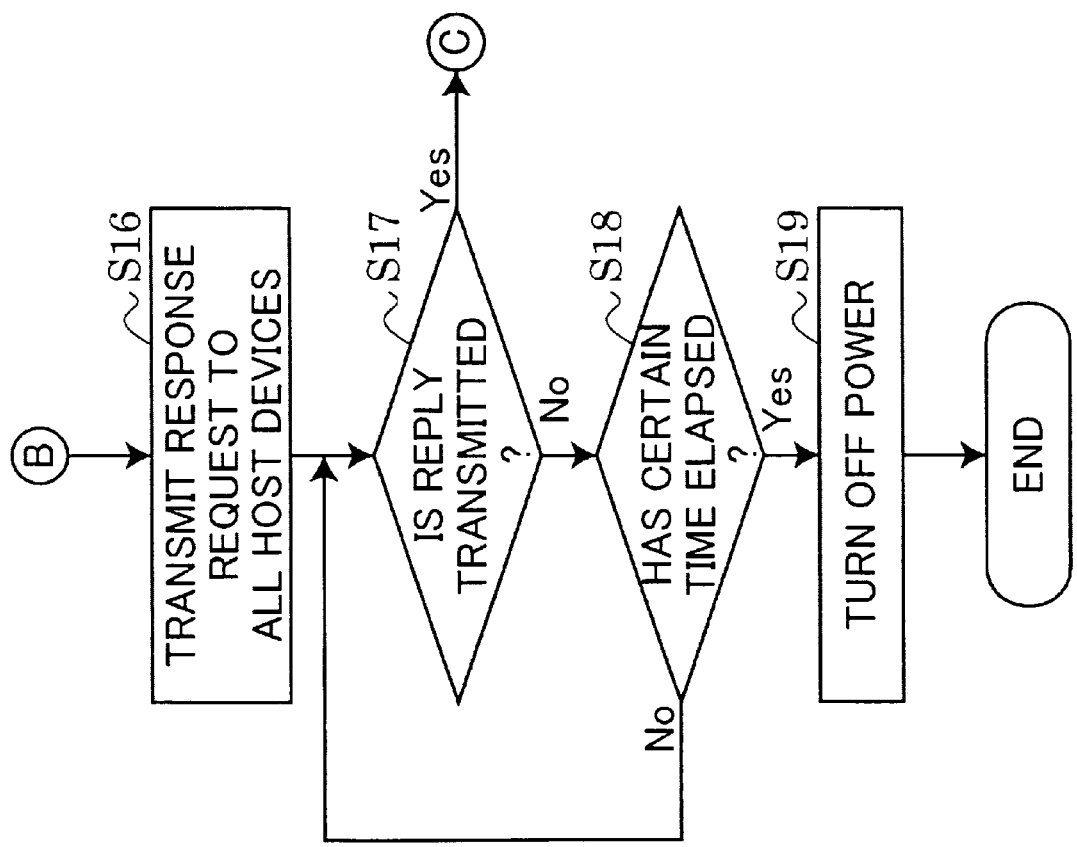
FIG. 8 is yet another flowchart illustrating an example procedure for operating the printer of FIG. 2.

Referring to FIGS. 6 through 8, flowcharts illustrate example procedures for operating the printer 1 according to the first embodiment of the present invention.

In step S1, where the power of the printer 1 is activated and a series of processes begin, the printer 1 determines whether or not the image data is received. Where the image data is received (Yes in step S1), flow proceeds to step S2 in which the printer 1 prints the image data and re-executes step S1.

On the other hand, where the printer 1 determines that the image data is not received in step S1 (No is step S1), flow proceeds to step S3 in which the printer 1 activates the timer 37. Here, the operation state monitor 35 monitors the reception of the image data in the image data receiver 21. The timer 37 is activated in response to a result monitored by the operation state monitor 35.

Next, in step S4, the printer 1 re-determines whether or not the image data is received. Where the image data is received (Yes in step S4), the host devices 5 in use exists in the network, and flow proceeds to step S5. In step S5, the timer 37 is reset, and flow proceeds to step S2.

On the other hand, where the image data is not received (No in step S4), flow proceeds to step S6. In step S6, the printer 1 activates the timer 37 and determines whether or not the certain time period elapses. Here, determination is made based on elapse of the certain time period that is determined by the user beforehand to shift the printer 1 to a power saving mode by halting the power supply. Where the certain time period does not elapse (No in step S6), the printer 1 re-executes step S4 and remains in a standby state for the image data.

On the other hand, where the printer 1 determines the elapse of the certain time period from a time that the timer 37 is activated (Yes in step S6), flow proceeds to step S7 in which the printer 1 shifts to the power saving mode by halting the power supply from the power supplier 9 to the print engine 17 that consumes a relatively high volume of the power. The power supplier 9, for example, decreases a temperature of the fixing unit so as to control the power consumption of the print engine 17. Here, the operation state monitor 35 instructs the power controller 39 to shift to the power saving mode after the printer 1 determines that a time counted by the timer 37 elapses the certain time period. Upon receiving the instruction, the power controller 39 decreases the power supply from the power supplier 9 to each element. Consequently, the power supplier 9 halts the power supply to the print engine 17 consuming the relatively high volume of the power, thereby decreasing the power consumption of the printer 1 as a whole.

Next, in step S8, the printer 1 resets the timer 37. In step S9, the printer 1 reactivates the timer 37, and the timer 37 counts a time period from a time of shifting to the power saving mode.

In step S10, the printer 1 determines whether or not the image data is received. Where the image data is received (Yes in step S10), the printer 1 shifts to the standby state from the power saving mode, and flow proceeds to step S5. In step S5, the timer 37 is reset, and subsequently, the printer 1 prints the image in step S2.

On the other hand, where the image is not received (No in step S10), flow proceeds to step S11 in which the printer 1 determines whether or not a certain time period elapses. The certain time period is determined by the user beforehand to shift the printer 1 from the power saving mode to a power-off state. Where the certain time period does not elapse (No in step S11), flow proceeds to step S10 again. However, where the certain time period elapses (Yes in step S11), flow proceeds to step S12 in flowchart of FIG. 7.

In step S12, the printer 1 determines whether or not a current time is within the office hours. Here, the operation state monitor 35 refers to the operation time of the printer 1 stored in the schedule memory 31, and compares with, for example, a current time, day, etc. obtained from an SNTP server serving as a clock. Where the current time is not within the office hours (No in step S12), flow proceeds to step S13 in which the printer 1 transmits the response request to a specific host device 5. For example, the specific host device 5 has a higher usage amount stored in the host information memory 29 relative to a certain usage amount. The printer 1 calculates the usage amount based on a print amount such as a used number of times, a number of dots of the dot data, a number of printed sheets during a day, last two weeks, and a last month, for example. Here, the request transmitter-receiver 23 refers to the usage amount stored in the host information memory 29, and transmits the response request to the specific host device 5, for example, having the usage amount of higher than thirty (30) percent. Such transmission of the response request to the specific host device 5 having the high usage amount allows the printer 1 to turn off the power, for example, when an infrequent user of the printer 1 forgets to turn off the power of the host devices 5. Moreover, such transmission of the response request to the specific host device 5 having the high usage amount allows the printer 1 to reduce (if not eliminate) an occurrence of turning off the power thereof, for example, when a frequent user uses the printer 1.

Next, in step S14, the printer 1 determines whether or not the reply is transmitted from the specific host device 5. Here, the operation state monitor 35 activates the timer 37, and monitors the presence or absence of the reply corresponding to the response request in the request transmitter-receiver 23 while referring to an elapsed time of the timer 37. Where the printer 1 determines that the reply is transmitted from at least one of the host devices 5 (Yes in step S14), the printer 1 re-executes step S8 in flowchart of FIG. 6. On the other hand, where no reply is transmitted (No in step S15), the printer 1 determines that the specific host device 5 is not currently in use by the user, and flow proceeds to step S15. In step S15, the power controller 39 halts the power supplied to all the power systems including the print engine 17 from the power supplier 9, so that the printer 1 turns off the power thereof.

In step S12, where the current time is within the office hours (Yes in step S12), flow proceeds to step S16 in flowchart of FIG. 8. In step S16, the printer 1 transmits the response requests to all the host devices 5. In step S17 in flowchart of FIG. 8, the printer 1 determines whether or not the replies corresponding to the response requests are transmitted. Where the reply is transmitted from at least one of the host devices 5 (Yes in step S17), the printer 1 determines that at least one of the host devices 5 is in use by the user, and flow proceeds to step S8.

On the other hand, where no reply is transmitted (No in step S17), flow proceeds to step S18 in which the printer 1 determines whether or not the certain time period elapses. Where the certain time period does not elapse (No in step S18), the printer 1 re-executes step S17.

Where the certain time period elapses (Yes in step S18), flow proceeds to step S19 in which the printer 1 turns off the power thereof, and flow ends.

During the office hours in which the printer 1 is expected to be used by a plurality of users, the printer 1 transmits the response requests to all the host devices 5 after shifting to the power saving mode. Outside the office hours, on the other hand, the printer 1 transmits the response request to the specific host device 5 having the high usage amount. Therefore, the printer 1 turns off the power when, for example, an infrequent user of the printer 1 leaves without turning off the power of the host devices 5.

A description of a printer 101 according to a second embodiment of the present invention will be given with reference to FIGS. 9 through 13. Since the printer 101 is similar to the printer 1, only components and/or configurations of the printer 101 that differ from those of the above first embodiment will be described, and like components will be given the same reference numerals as above and description thereof will be omitted.

Figure 9:
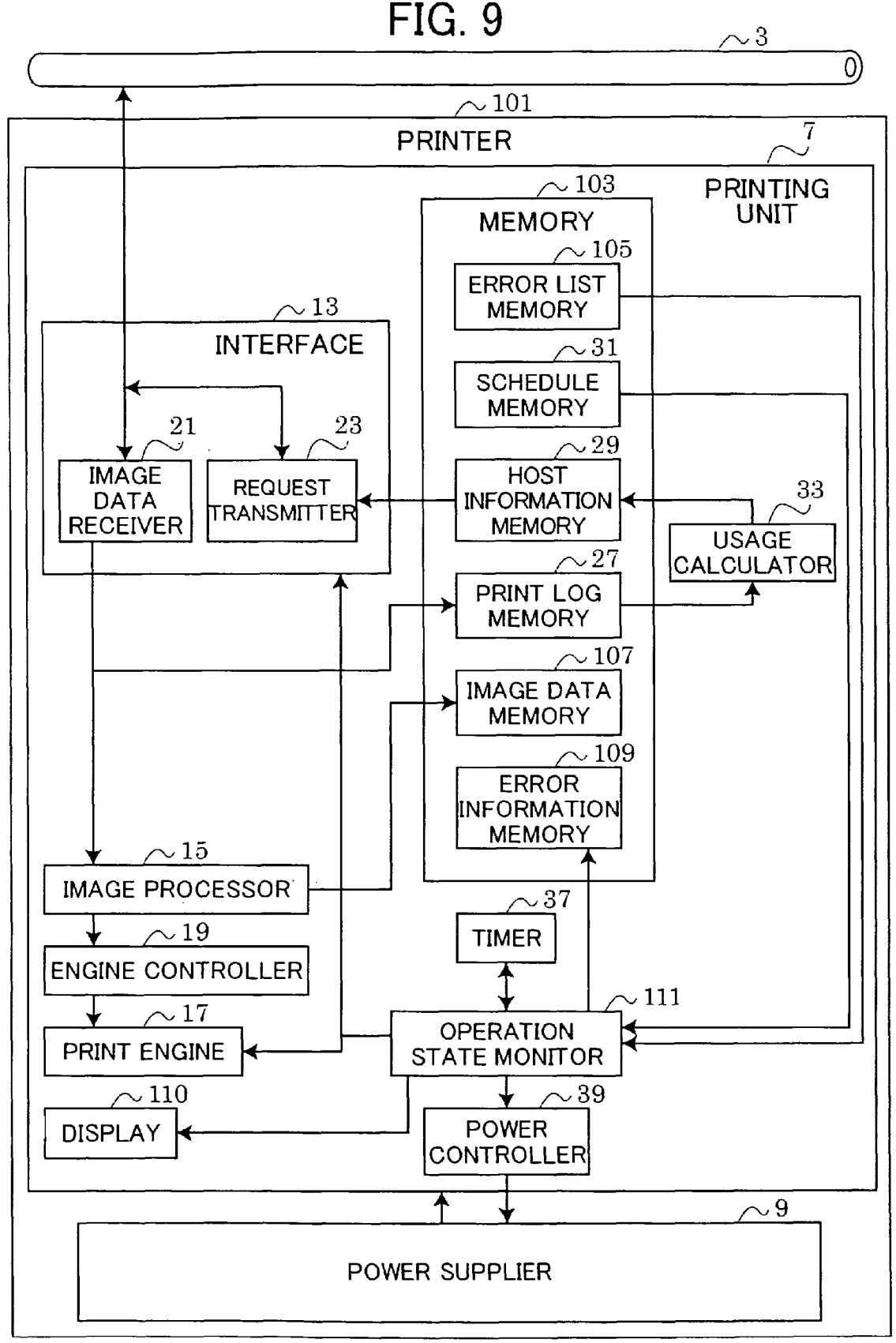
FIG. 9 is a block diagram illustrating a printer according to a second embodiment of the present invention.

Referring to FIG. 9, the printer 101 according to the second embodiment of the present invention is illustrated. The printer 101 includes a memory 103 including an error list memory 105, an image data memory 107, and an error information memory 109 in addition to the configurations of the memory 25 of the first embodiment. The error list memory 105 stores a list of an error and restorability thereof. The image data memory 107 stores the image data transmitted from the host devices 5. The error information memory 109 stores a detail of an actual error occurred.

Referring to FIG. 10, an example list of the error and the restorability thereof stored in the error list memory 105 is illustrated. The error list memory 105 stores an occurrable error in the print engine 17 and the restorability thereof. Such an error list is determined and stored in the error list memory 105 by the user beforehand. As illustrated in FIG. 10, errors such as a jammed sheet and out of sheet are set as "EASY" in the restorability since such errors can be restored relatively easily. On the other hand, errors such as out of toner and a damage of an element are set as "DIFFICULT" since such errors can consume time and/or labor for restoration.

The error information memory 109 stores the actual error that has actually occurred. Information on such an actual error is stored in the error information memory 109 based on the error detected by an operation state monitor 111.

Figure 11:
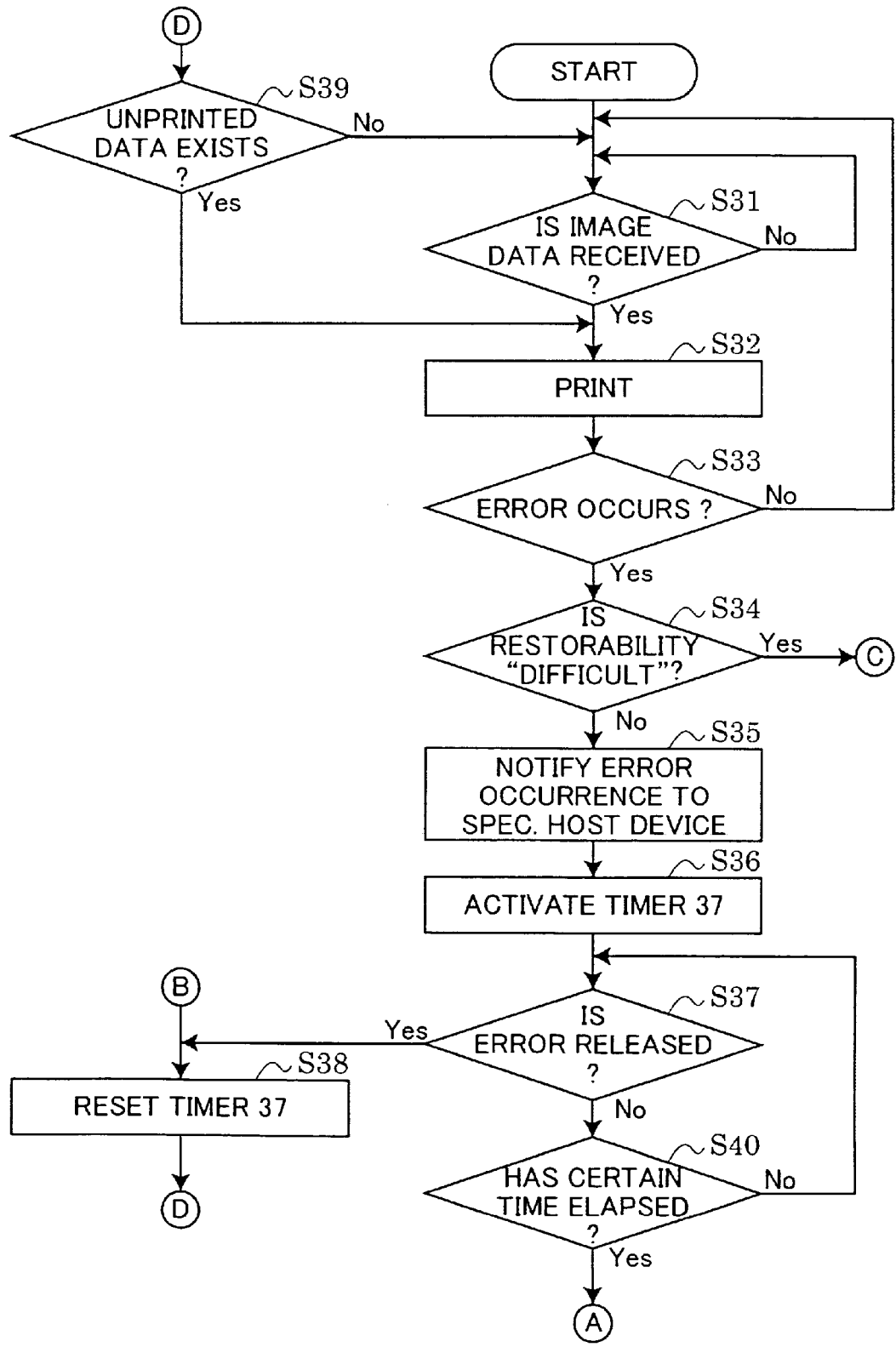
FIG. 11 is a flowchart illustrating an example procedure for operating the printer of FIG. 9.
Figure 12:
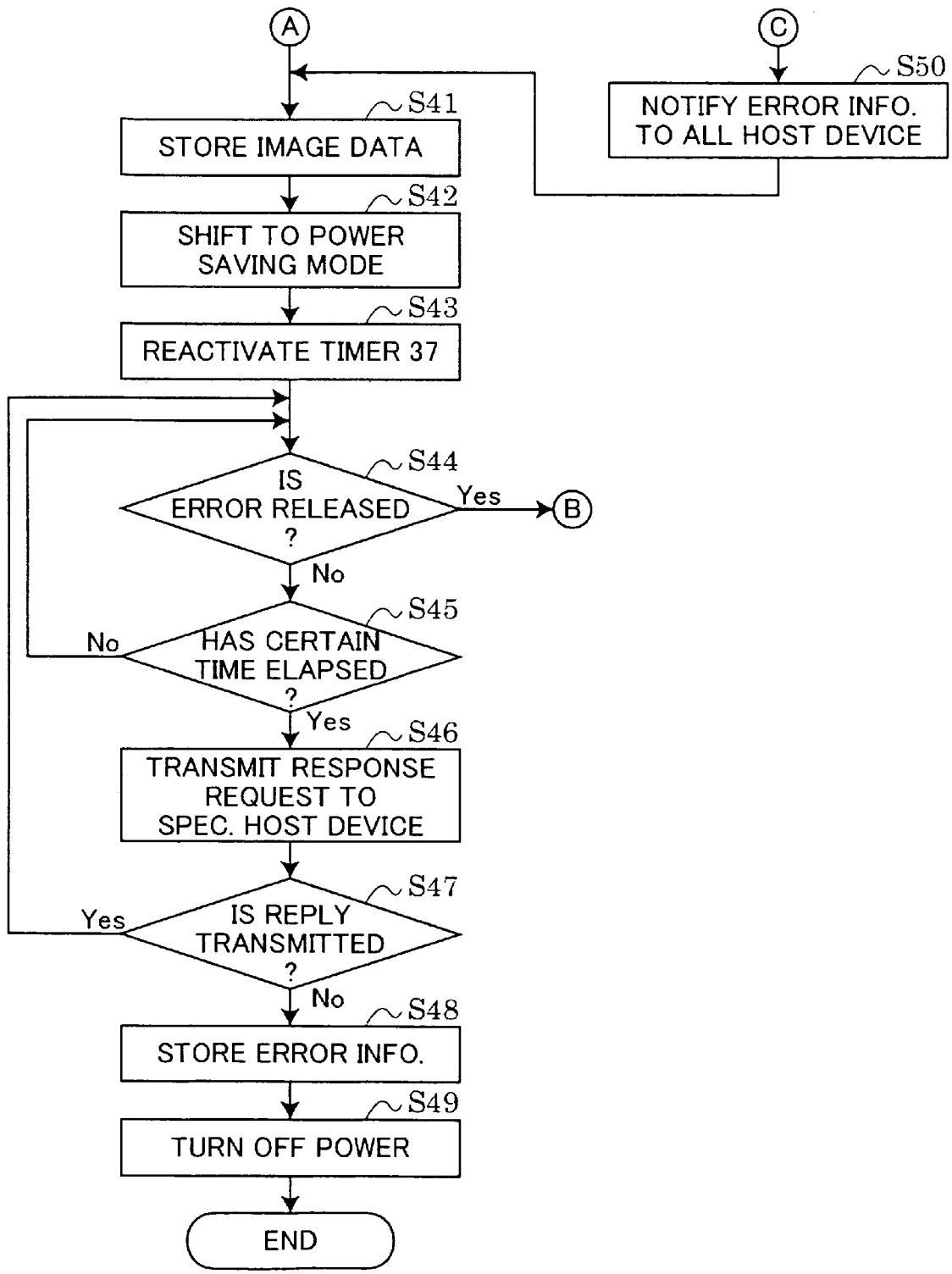
FIG. 12 is another flowchart illustrating an example procedure for operating the printer of FIG. 9.

Referring to FIGS. 11 and 12, an example procedure for operating the printer 101 is illustrated.

In step S31, where a series of processes begin, the printer 101 determines whether or not the image data is received. Where the image data is received (Yes in step S31), flow proceeds to step S32 in which the printer 101 prints the image.

Next, in step S33, the printer 101 determines whether or not the error occurs. Here, the operation state monitor 111 monitors a state of the print engine 17. Where no error is determined (No in step S33), the printer 101 re-executes step S31.

On the other hand, where the actual error is determined (Yes in step S33), flow proceeds to step S34. In step S34, the printer 101 refers to the detail of the error and the error list so as to determine whether or not the restorability of the error is "DIFFICULT". Where the error is not determined as "DIFFICULT" (No is step S34), the error is determined as easily restorable, and the printer 101 executes step S35.

In step S35, the printer 101 notifies an occurrence of the actual error to the specific host device 5 having the higher usage amount than the criterion usage amount. In step S36, the printer 101 activates the timer 37 so as to count an elapsed time period from a time that the actual error is notified.

Subsequently, in step S37, the printer 101 determines whether or not the error is released. Here, the operation state monitor 111 monitors the state of the print engine 17. Where the error is released (Yes in step S37), flow proceeds to step S38. In step S38, the printer 101 resets the timer 37, and flow proceeds to step S39 in which the printer 101 determines whether or not unprinted image data exists. Where the unprinted image data does not exists (No in step S39), flow proceeds to step S31. On the other hand, where the unprinted image data exists (Yes in step S39), flow proceeds to step S32.

Where the error is not released (No in step S37), flow proceeds to step S40 in which the printer 101 determines whether or not the certain time period has elapsed from a time that the actual error is notified. When the certain time period has not elapsed (No in step S40), the printer 101 re-executes step S37.

Where the certain time period has elapsed (Yes in step S40), flow proceeds to step S41 in flowchart of FIG. 12. In step S41, the printer 101 stores the image data in the image data memory 107. Then, in step S42, the printer 101 shifts to the power saving mode, and flow proceeds to step S43. In step 43, the printer 101 restarts the timer 37 so as to count an elapsed time period from a time of shifting to the power saving mode.

In step S44, the printer 101 determines whether or not the error is released. Where the error is released (Yes in step S44), flow proceeds to step S38 in flowchart of FIG. 11. Where the error is not released (No in step S44), flow proceeds to step S45 in which the printer 101 determines whether or not the certain time period has elapsed from a time of shifting to the power saving mode. Where the certain time period has not elapsed (No in step S45), the printer 101 re-executes step S44.

On the other hand, where the certain time period has elapsed (Yes in step S45), flow proceeds to step S46 in which the printer 101 transmits the response request to the specific host device 5. Next, in step S47, the printer 101 determines whether or not the presence of absence of reply corresponding to the response request. Where the reply is transmitted (Yes in step S47), the printer 101 re-executes step S44.

Where the reply is not transmitted (No in step S47), flow proceeds to step S48 in which the printer 101 stores the detail of the actual error as the error information in the error information memory 109. Here, the operation state monitor 111 writes the detail of the actual error occurred in the error information memory 109. Next, in step S49, the printer 101 turns off the power, and flow ends.

Moreover, where the error is determined as "DIFFICULT" in step S34, flow proceeds to step S50 in FIG. 12. In step S50, the printer 101 notifies the error information to all the host devices 5, and then flow proceeds to step S41 for shifting to the power saving mode.

Where the printer 101 is activated after completion of the series of processes described above, the printer 101 executes step S51 in flowchart of FIG. 13. In step S51, the printer 101 determines whether or not the error information is stored in the error information memory 109. Where the error is stored in the error information memory 109 (Yes in step S51), flow proceeds to step S52 in which the printer 101 displays the error information to the user. Next, in step S53, the printer 101 continues to display the error information until the error is released. Where the error is released (Yes in step S53), or where the error is not stored in the error information memory 109 (No in step S51), flow proceeds to step S54. In step S54, the printer 101 activates each element. Next, in step S55, the printer 101 determines whether or not the unprinted data exists. When the unprinted data exists (Yes in step S55), flow proceeds to step S56 in which the printer 101 executes the print process. Subsequently, the printer 101 ends the series of processes.

According to the second embodiment of the present invention, where the print process is halted by the error occurrence and the printer 101 is not in use by the user, the printer 101 can reduce the power consumption by turning off the power thereof.

The foregoing disclosure and description of the printer 1 and the printer 101 according to the first and second embodiments are illustrative only and are not to be considered limiting.

According to the first and second embodiments, for example, the temperature of the fixing unit included in the print engine 17 is decreased when the printers 1 and 101 shift to the power saving mode. However, a process of shifting the printers 1 and 101 to the power saving mode can be provided as long as the information transmitted from the host devices 5 is changed to a receivable state in the interface 13.

As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An image processing apparatus connectable to a plurality of host devices, the image processing apparatus comprising:

an image forming unit for forming an image based on image data transmitted from the plurality of host devices;

a power supply unit for supplying power to a power system including the image forming unit;

a power control unit for controlling the power supplied from the power supply unit to the power system;

a request transmitter-receiver; and a host information memory, wherein the power control unit shifts to a power saving mode if no processing is performed within a first predetermined time period, wherein the power control unit halts the power supply unit after a second predetermined time period has passed following shifting to the power saving mode, wherein the plurality of host devices are registered at the host information memory, and the request transmitter-receiver determines, based on a current time, a specific host device among the plurality of host devices to transmit a response request, and wherein if the current time is within a prescribed time, the request transmitter-receiver transmits the response request to all of the registered host devices, and if the current time is not within the prescribed time, the request transmitter-receiver transmits the response request to a specific host device among the plurality of host devices.

2. The image processing apparatus according to claim 1, further comprising:
   a memory for storing a usage amount of each of the plurality of host devices;
   a signal transmission unit for transmitting a response request signal to a specific host device among the plurality of host devices, the specific host device having at least a predetermined usage amount stored in the memory; and
   a transmission timer for measuring an elapsed time period from a time point that the response request signal is transmitted to the specific host device from the signal transmission unit,
   wherein the power control unit halts a power supply of the power supply unit that supplies power to the power system when determining, based on the elapsed time period measured by the transmission timer, that a reply corresponding to the response request signal is not transmitted from the specific host device for a predetermined time period.

3. The image processing apparatus according to claim 2, further comprising:
   a power supply timer for measuring the elapsed time period from a time point of shifting to the power saving mode to the time point of the power supply unit being halted by the power control unit,
   wherein the signal transmission unit transmits the response request signal to the specific host device when the elapsed time period measured by the power supply timer exceeds a predetermined time period.

4. The image processing apparatus according to claim 3, further comprising:
   an office hour memory for storing an office hour determined by a user beforehand; and
   a clock for managing a current time,
   wherein the signal transmission unit transmits the response request signals to all of the plurality of host devices when the elapsed time period measured by the power supply timer exceeds the predetermined time period and the current time managed by the clock is within the office hour stored in the office hour memory.

5. The image processing apparatus according to claim 2, wherein the usage amount is calculated based on at least one of a past used number of times, a number of dots of the image data, and a number of printed sheets based on the image data.

6. The image processing apparatus according to claim 1, wherein the prescribed time is during office hours.

7. The image processing apparatus according to claim 1, wherein the specific host device has a higher usage amount relative to a prescribed usage amount.

8. An image processing apparatus connectable to a plurality of host devices, the image processing apparatus comprising:
   an image forming unit for forming an image based on image data transmitted from the plurality of host devices;
   a power supply unit for supplying power to a power system including the image forming unit;
   a power control unit for controlling the power supplied from the power supply unit to the power system;
   an error detection unit for detecting an occurrence of an error in the image forming unit,
   a request transmitter-receiver; and
   a host information memory,
   wherein the power control unit shifts to a power saving mode upon detection of the error occurrence at the error detection unit, the power control unit halting the power supply unit upon the first predetermined time having elapsed after shifting to the power saving mode,
   wherein the plurality of host devices are registered at the host information memory, and the request transmitter-receiver determines, based on a type of error, a specific host device among the plurality of host devices to transmit a response request, and
   wherein if the type of error is error that is relatively difficult to restore, the request transmitter-receiver transmits the response request to all of the registered host devices, and if the type of error is error that is relatively easily restored, the request transmitter-receiver transmits the response request to the specific host device among the plurality of host devices.

9. The image processing apparatus according to claim 8, further comprising:
   a memory for storing a usage amount of each of the plurality of host devices;
   a signal transmission unit for transmitting a response request signal to a specific host device among the plurality of host devices when the error detection unit detects the error, the specific host device having at least a predetermined usage amount stored in the memory; and
   a transmission timer for measuring an elapsed time period from a time that the response request signal is transmitted from the signal transmission unit to the specific host device,
   wherein the power control unit halts a power supply of the power supply unit that supplies power to the power system when determining, based on the elapsed time period measured by the transmission timer, that a reply corresponding to the response request signal is not transmitted from the specific host device for a predetermined time period.

10. The image processing apparatus according to claim 8, wherein the power control unit determines restorability of the occurred error, the power control unit shifting to the power saving mode in a case where the restorability of the error occurred is determined to be "DIFFICULT."

11. The image processing apparatus according to claim 8, wherein the power control unit determines restorability of the occurred error, in a case where the restorability of the error occurred is determined to be "EASY," the power control unit shifting to the power saving mode if the error is not released within a predetermined time period.

12. The image processing apparatus according to claim 8, wherein the power control unit changes a destination based on the level of the restorability of the error.

13. The image processing apparatus according to claim 8, wherein the power control unit shifts to a standby state if the error is released within the first predetermined time period.

14. The image processing apparatus according to claim 8, wherein:
   the power control unit stores the error information when halting the power supply,
   the power control unit determines whether or not the error information is stored when the power is again turned on,
   the power control unit displays the error information where the error information is stored,
   the power control unit activates each element where the error is released, and the power control unit performs a printing process for unprinted data.

15. An image processing apparatus connectable to a plurality of host devices, the image processing apparatus comprising:
- an image forming unit for forming an image based on image data transmitted from the plurality of host devices;
- a power supply unit for supplying power to a power system including the image forming unit;
- a power control unit for controlling the power supplied from the power supply unit to the power system;
- an image data receiver for receiving the image data transmitted from the plurality of host devices; and
- an image data memory for storing the image data received at the image data receiver,
- wherein the power control unit shifts to a power saving mode if no processing is performed within a first predetermined period, and the power control unit halts the power supply unit after a second predetermined time period has passed following shifting to the power saving mode, and
- wherein image data transmitted from the plurality of host devices are transmitted to the image data memory that is different from the image data receiver when the power control unit shifts to the power saving mode.

* * * * *